(12) United States Patent
Kurien et al.

(10) Patent No.: US 6,687,653 B1
(45) Date of Patent: Feb. 3, 2004

(54) SYSTEMS AND METHODS FOR DISTRIBUTED ALGORITHM FOR OPTIMIZATION-BASED DIAGNOSIS

(75) Inventors: James A. Kurien, Cupertino, CA (US); Xenofon Koutsoukos, Sunnyvale, CA (US); Feng Zhao, Campbell, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/217,026

(22) Filed: Aug. 13, 2002

(51) Int. Cl.$^7$ ............................................. G21C 17/00
(52) U.S. Cl. ......................................... 702/183; 714/25
(58) Field of Search ........................ 702/113–115, 122, 702/179, 181–188, FOR 103, FOR 104, FOR 111, FOR 123, FOR 124, FOR 133, FOR 134, FOR 135, FOR 139, FOR 170, FOR 171; 700/26–28, 213–244; 340/540, 531, 539.14; 375/224, 227, 260; 714/25–31

(56) References Cited

U.S. PATENT DOCUMENTS

| | | | | |
|---|---|---|---|---|
| 6,014,612 A | * | 1/2000 | Larson et al. | 702/183 |
| 6,104,988 A | * | 8/2000 | Klarer | 702/183 |
| 6,330,525 B1 | * | 12/2001 | Hays et al. | 702/183 |
| 6,434,512 B1 | * | 8/2002 | Discenzo | 702/184 |
| 6,437,692 B1 | * | 8/2002 | Petite et al. | 340/540 |
| 6,446,027 B1 | * | 9/2002 | O'Keeffe et al. | 702/183 |
| 6,499,114 B1 | * | 12/2002 | Almstead et al. | 714/25 |

OTHER PUBLICATIONS

Y. Pencolé et al., "Incremental decentralized diagnosis approach for the supervision of a telecommunication network", Twelfth International Workshop on Principles of Diagnosis (DX–01), 2001.
G. Lamperti et al., "Principles of Distributed Diagnosis of Discrete–Event Systems", Twelfth International Workshop on Prinicples of Diagnosis (DX–010), 2001.
J. de Kleer et al., "Diagnosing Multiple Faults", *Artificial Intelligence*, vol. 32, No. 1, 1987.
J. de Kleer et al., "Diagnosis With Behavioral Modes", In Proc. IJCAI–89, 1989.
Kurien et al., "Distributed Diagnosis of Networked Hybrid Systems", AAAI Spring Symposium, Mar. 25, 2002.
Xenofon Koutsoukos et al., "Collaborative Monitoring and Diagnosis of Embedded Systems", AAAI Spring Symposium, Mar. 25, 2002.
James Kurien et al., "Distributed Diagnosis of Networked, Embedded Systems", Workshop on Diagnosis Symposium, May 2, 2002.

* cited by examiner

*Primary Examiner*—Marc S. Hoff
*Assistant Examiner*—Mohamed Charioui
(74) *Attorney, Agent, or Firm*—Oliff & Berridge, PLC

(57) ABSTRACT

A system for the distributed diagnosis of a physical system includes serveral local diagnostic subsystems that generate local diagnoses based on observations of a component of the physical system. An interface is defined by which the local diagnostic subsystems communicate. Further, an algorithm for assembling a global diagnosis from the local diagnoses is fined.

4 Claims, 8 Drawing Sheets

SYSTEMS AND METHODS FOR DISTRIBUTED ALGORITHM FOR OPTIMIZATION-BASED DIAGNOSIS

BACKGROUND OF THE INVENTION

1. Field of Invention

This invention generally relates to systems and methods for processing distributed information.

2. Description of Related Art

Model-based diagnosis techniques use a model of a complex physical system, such as a printer or a vehicle, in order to diagnose the state of the system from the commands send to the system and the sensor observations received as a result. Such a system may comprise several subsystems, each made up of many components.

Model-based diagnosis techniques use a formal description of a device or physical system to automatically diagnose a system with a generic, reusable algorithm. A set of variables that represent relevant properties about a device to be diagnosed is defined. Next, a set of constraints that describe the normal and failure behaviors of the system is defined. The diagnostic algorithm then uses this constraint-based model to determine whether the system is operating in a normal manner, and, if not, what failures explain the abnormal behavior of the system.

SUMMARY OF THE INVENTION

However, the model-based diagnosis techniques are typically centralized. That is, a single diagnosis is performed for the entire system to be diagnosed. Thus, a central processor must resolve the global diagnosis problem, all observations must be routed to the central processor, and a single model of the entire system to be diagnosed must be created and stored on the central processor. Additionally, the centralized processor then needs to forward the diagnosis back to the various control processors within the physical system being diagnosed. This centralization represents a significant performance and development bottleneck.

This invention provides systems and methods that allow the diagnosis to be distributed among several communicating processors.

This invention separately provides systems and methods for dividing the centralized diagnostic system into separate subsystems.

This invention separately provides systems, methods and protocols for communicating between the separate diagnostic subsystems.

This invention separately provides systems and methods for assembling a global diagnosis of the system being diagnosed from the local diagnoses developed by each diagnostic subsystem.

Splitting a large exponential problem such as diagnosis into smaller problems solved using multiple subsystems result in diagnoses being found more quickly. In addition, separate diagnostic subsystems can perform diagnosis for each corresponding subsystem of the system being diagnosed and communicate that local diagnosis to form a global diagnosis for the entire system being diagnosed. This eliminates needing to forward all observations to a centralized computer, increasing robustness, decreasing communication costs, and reducing latency. This also allows the vendor of each subsystem being diagnosed to provide a diagnostic subsystem for that subsystem being diagnosed that is specifically designed to diagnose that subsystem. A common communication protocol allows the local diagnoses to be supplied to other diagnostic subsystems so that a global diagnosis can be generated.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of this invention will be described in detail, with reference to the following figures, wherein.

DETAILED DESCRIPTION OF EXEMPLARY EMBODIMENTS

Figure 1:
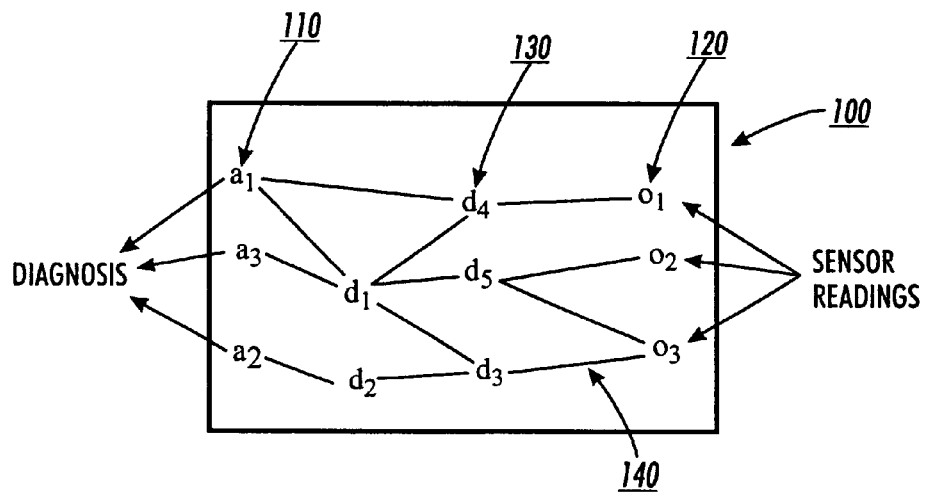
FIG. 1 illustrates an embodiment of a model-based centralized diagnostic system.

FIG. 1 illustrates one exemplary embodiment of a model-based centralized diagnostic system 100. As shown in FIG. 1, the system 100 includes a set of assumption variables 110. The assumption variables represent the assumptions of the states of the various components of the system being diagnosed. Each assignment of a value to an assumption variable 110 has a cost. In various exemplary embodiments, an assignment of a value to an assumption variable 110 represents an assumption about the current state, such as normal or failure, of the corresponding component of the system being diagnosed. In various exemplary embodiments, the cost represents the prior probability of that assumption variable having that value, which corresponds to the prior probability of the corresponding component being in that state. In various exemplary embodiments, the cost may represent an energy used by the system, the desirability of a state for a component of the system being diagnosed, or any evaluative parameter used in various exemplary optimization tasks.

The diagnostic system 100 also has a set of observation variables 120. Each observation variable 120 represents a quantity that may be observed by a corresponding sensor of the diagnostic system 100 that is attached to the system being diagnosed. Each observation variable 120 is assigned a value that cannot be unassigned, because that value is based on the output of the corresponding sensor and thus represents a current status of the system being diagnosed. Further, the diagnostic system 100 has a set of dependent variables 130. The values of the dependent variables 130 represent quantities that relate the set of assumption variables 110 to the set of observation variables 120.

The diagnostic system 100 also has a set of constraint values 140 between the variables that describe the behavior of the modeled system being diagnosed. A constraint value 140 may be defined between two dependent variables 130, between an assumption variable 110 and a dependent variable 130, between a dependent variable 130 and an observation variable 120, or between an assumption variable 110 and an observation variable 120. In the diagnostic system 100, the observation variable $o_3$ is constrained by the dependent variables $d_5$ and $d_3$. The value of the dependent variable $d_3$ is in turn constrained by the dependent variables $d_1$ and $d_2$, whose values are constrained by the assumption variables $a_2$ and $a_3$.

Given the constraint values 140, any choice of values assigned to the assumption variables 110 will enable the diagnostic system 100 to predict values for the observation variables 120 that would be expected in view of those values assigned to the assumption variables 110. Thus, given a set of values assigned to the observation variables 120 in view of the outputs of the corresponding sensors, a diagnosis of the system being diagnosed comprises a set of assignments of the values of the assumption variables 110 that results in a set of derived values for the observation variables 120 that are consistent with the assigned values of the observation variables 120 based on the sensors outputs. In various exemplary embodiments, if a probability is assigned to each value an assumption variable 110 can take, then the diagnosis with the highest likelihood may be obtained.

Thus, with respect to the diagnostic system 100, if the diagnostic system 100 assigns values to the assumption variables $a_2$ and $a_3$ that are inconsistent with derived and assigned values for the observation variable $o_3$, the diagnostic system 100 will have to change the values assigned to one or more of the assumption variables $a_2$ or $a_3$ to make the derived values for the observation variable $o_3$ consistent with the assigned values for the observation variable $o_3$. Similarly, the diagnostic system 100 may change the value assigned to the assumption variable $a_1$, as the assumption variable $a_1$ also constrains the observation variable $o_3$ through the dependent variables $d_1$ and $d_5$. Choosing which assumption variable 110 to change depends on the cost of each value that can be assigned to the various assumption variables $a_1$–$a_3$, as well as the derived values for the observation variables that a new value assigned to an assumption variable 110 causes to change via the constraints.

Figure 2:
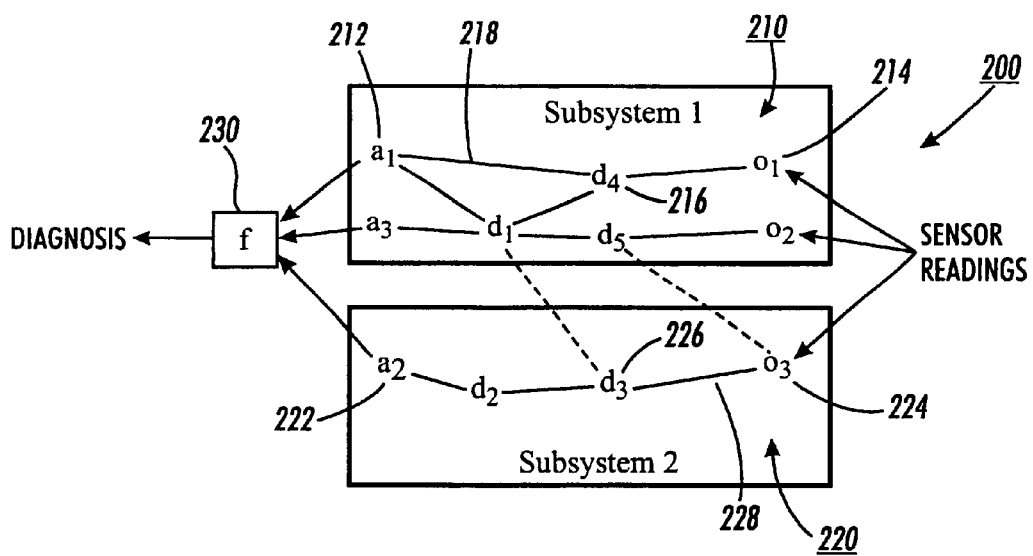
FIG. 2 illustrates a first exemplary embodiment of a distributed model-based diagnostic system according to the invention.

FIG. 2 illustrates a first embodiment of a distributed optimization-based diagnostic system 200 in accordance with the invention. As shown in FIG. 2, the distributed optimization-based diagnostic system 200 contains a first diagnostic subsystem 210 and a second diagnostic subsystem 220. The distributed optimization-based diagnostic system 200 is used to diagnose faults in a system to be diagnosed. The system to be diagnosed includes two distinct subsystems, where each subsystem to be diagnosed corresponds to or is modeled by, one of the first and second diagnostic subsystems 210 and 220. The first diagnostic subsystem 210 contains one or more assumption variables 212, one or more observation variables 214, and zero, one or more dependent variables 216. The variables are related by one or more constraints 218.

Similarly, the second diagnostic subsystem 220 contains one or more assumption variables 222, one or more observation variables 224, and zero, one or more dependent variables 226, all related by one or more constraints 228. The one or more constraints 228 also relates one or more observation variables 214 and/or 224 and/or one or more dependent variables 216 and/or 226 between the first diagnostic subsystem 210 and the second diagnostic subsystem 220.

In operation, the observation variables 214 of the first diagnostic subsystem 210 and the observation variables 224 of the second diagnostic subsystem 220 are set to values corresponding to sensor readings from the monitored device. A global diagnosis function 230 accepts values from the one or more assumption variables 212 of the first diagnostic subsystem 210 and the one or more assumption variables 222 of the second diagnostic subsystem 220 to produce a diagnosis.

The diagnosis includes a minimal cost assignment of values to the assumption variables 212 and 222 that is consistent with the constraints 218 and 228. For example, when the current value assigned to the assumption variables 212 and/or 222 are inconsistent with observation variable $o_3$, the second subsystem 230 can eliminate the inconsistency by changing the value assigned to the assumption variable $a_2$. In various exemplary embodiments, changing the value assigned to this assumption variable 212 changes the probability of the overall set of values assigned to the assumption variables 212, and thus the diagnosis. Changing the value assigned to this assumption variable 212 may also have ramifications on one or more other observation variables 214 and/or 224, such as, for example, the observation variable $o_2$ via the dependent variables $d_1$ and $d_5$. Alternately, in various exemplary embodiments, the first diagnostic subsystem 210 can change the value assigned to the assignment variables $a_1$ or $a_3$, engendering a different impact on the probability of the overall set of values assigned to the assumption variables 212 and the values for the observation variables 214.

Thus, to maintain consistency with the values of the observation variables required by the outputs of the sensors, multiple diagnostic subsystems that generate local diagnoses must collaborate. In addition to producing the same results as a centralized diagnostic system, in various exemplary embodiments, this collaboration of diagnostic subsystems takes place in a manner that increases the amount of independent decision making or determinations that each local diagnostic subsystem can perform and reduces the amount of communication between the local diagnostic subsystems.

Figure 3:
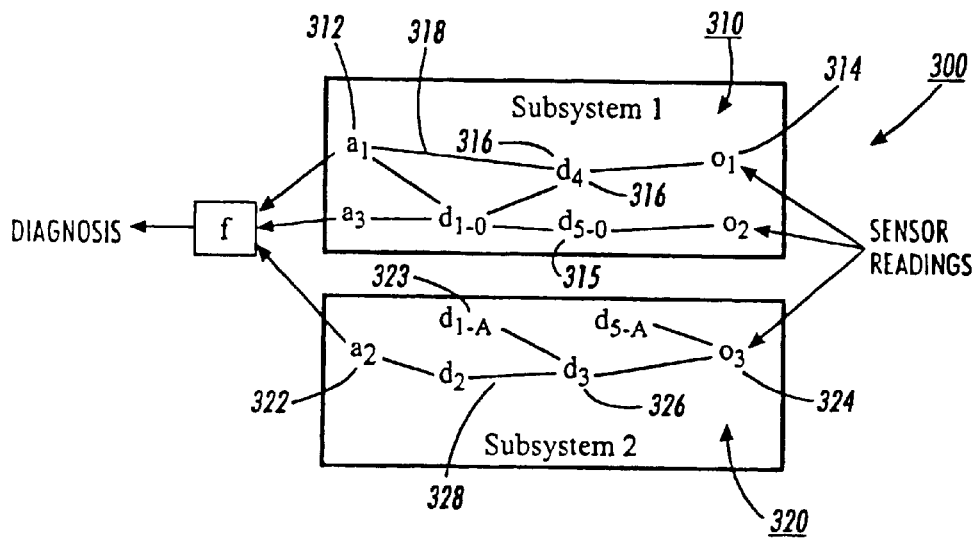
FIG. 3 illustrates a second exemplary embodiment of a distributed model-based diagnostic system according to the invention.

FIG. 3 illustrates a second embodiment of a distributed diagnostic system that provides optimization-based diagnosis in accordance with the invention. As shown in FIG. 3, the distributed system 300 is similar to the distributed diagnostic system 200 of FIG. 2. Specifically, in FIG. 3, the distributed system 300 contains a first diagnostic subsystem 310 and a second diagnostic subsystem 320. The first diagnostic subsystem 310 contains one or more assumption variables 312, one or more observation variables 314, and one or more dependent variables 316. The assumption, observation and dependent variables 312, 314 and 316 are related by one or more constraints 318.

The second diagnostic subsystem 320 contains one or more assumption variables 322, one or more observation variables 324, and one or more dependent variables 326, all related by one or more constraints 328.

The first diagnostic subsystem 310 also contains one or more pseudo-observation variables 315. A pseudo observation variable 315 enables a local diagnostic system to be informed of the value required by a remote diagnostic subsystem for one of its dependent variables 316, and also allows the local diagnostic subsystem to find the actual cost of supporting the requested value for the remote dependent variable 315 through the existing diagnostic search. The second local diagnostic subsystem 310 also contains one or more pseudo-assumption variables 323. A pseudo-assumption variable 323 allows a local diagnostic subsystem to represent the cost of changing a dependent variable 326 when that dependent variable is stored in a remote diagnostic subsystem.

Figure 4:
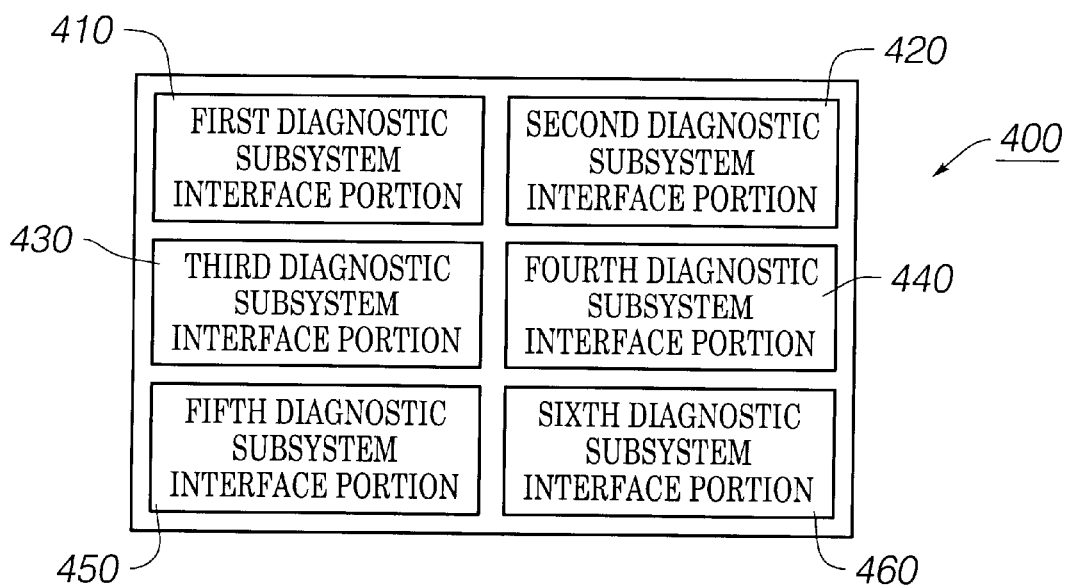
FIG. 4 illustrates one exemplary embodiment of a diagnostic system interface according to the invention.

FIG. 4 illustrates one exemplary embodiment of a diagnostic interface 400 that each local diagnostic subsystem must support in accordance with various exemplary embodiments of the systems and methods of this invention. In FIG. 4, the interface 400 provides six diagnostic subsystem interface portions 410–460. A local diagnostic subsystem, such as the subsystems 210, 220, 310 and/or 320, determines or derives the value of each local observation variable based on the most likely assignment of values to each local assumption variable.

The first diagnostic subsystem interface portion 410 allows a local diagnostic subsystem to access information on other local diagnostic subsystems that allows this local diagnostic subsystem to determine those most likely assignments. The second diagnostic subsystem interface portion 420 enables a local diagnostic subsystem to determine or derive the likelihood of the second most likely value for each observation variable. The third diagnostic subsystem interface portion 430 enables a local diagnostic subsystem to find the most likely value assignments to the assumption variables based on a given assignment of the values for the observation variables.

The fourth diagnostic subsystem interface portion 440 enables a local diagnostic subsystem to find the most likely assignment of the values to the assumption variables other than a present assignment of a value of an assumption variable, given an assignment of the values of the observation variables and that present value assigned to that assumption variable. The fifth diagnostic subsystem interface portion 450 enables a local diagnostic subsystem to update the likelihoods of the values that are assignable to an assumption variable. The sixth diagnostic subsystem interface portion 460 enables a local diagnostic subsystem to update the assignments to the observations.

The interface 400 enables the values assigned to the assumption, observation and dependent variables of a local diagnostic subsystem to be used by another local diagnostic subsystem without that local diagnostic subsystem having to have any knowledge of the implementation of the first local diagnostic subsystem. That local diagnostic subsystem will have no indication that the value of one of its observation variables is in fact used as the value of the assumption variable of another local diagnostic subsystem, nor that that local diagnostic subsystem is participating in a decentralized diagnosis system. The interface 400 thus provides a framework for integrating heterogeneous diagnosis subsystems into a single diagnostic system.

Figure 5:
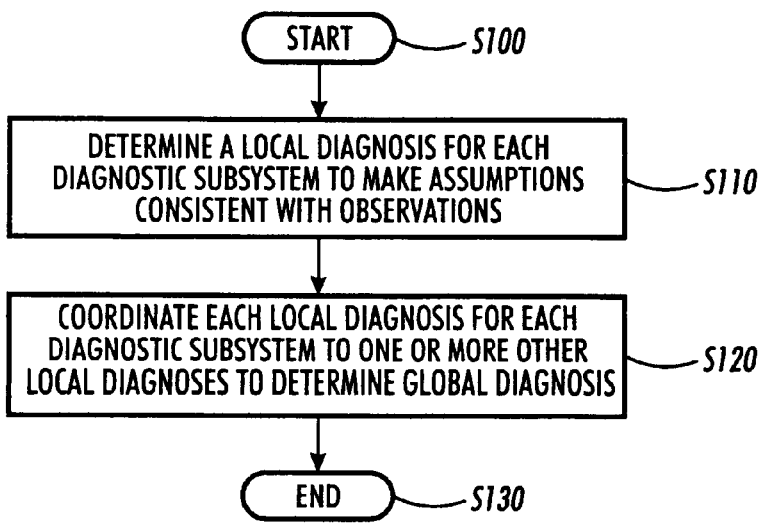
FIG. 5 is a flowchart outlining a first exemplary embodiment of a method for a distributed model-based diagnosis method according to the invention.

FIG. 5 is a flowchart outlining one exemplary embodiment of a distributed model-based diagnostic method in accordance with the invention. As shown in FIG. 5, operation of the process begins in step S100, and continues to step S110, where each local diagnostic subsystem of a distributed diagnostic system determines a local diagnosis that makes the values of the local assumption variables consistent with the values of the local observation variables received from the associated sensors. Next, in step S120, each local diagnostic subsystem coordinates its local diagnosis to the local diagnoses of one or more of the other local diagnostic subsystems to determine a global diagnosis. Then in step S130, the method ends.

Figure 6:
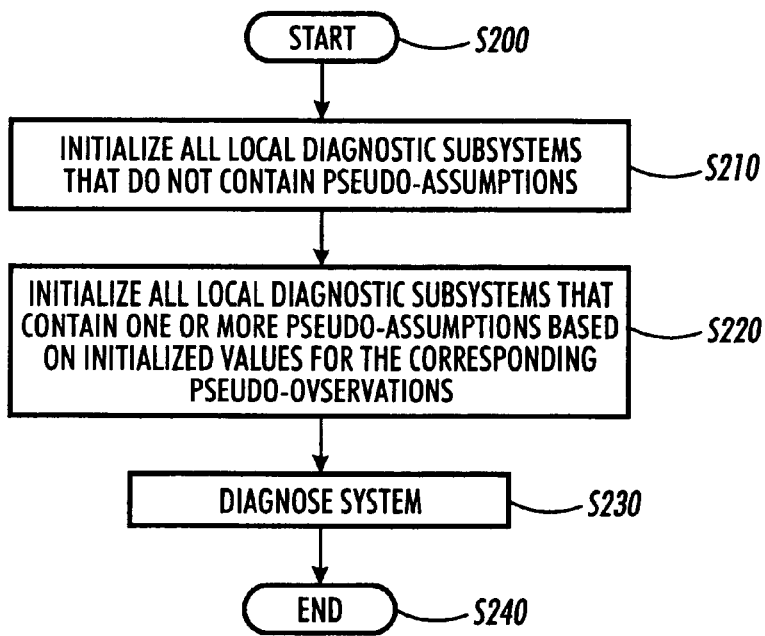
FIG. 6 is a flowchart outlining a second exemplary embodiment of a method for a distributed model-based diagnosis method according to the invention.

FIG. 6 is a flowchart outlining a second exemplary embodiment of a distributed model-based diagnostic method in accordance with the invention. As shown in FIG. 6, the method begins in step S200, and continues to step S210, where all local diagnostic subsystems that do not contain any pseudo-assumption variables are initialized by setting the values of their pseudo-observation variables to initial values. Next, in step S220, any remaining local diagnostic subsystems that contain one or more pseudo-assumption variables are initialized. The pseudo-assumption variables are initialized based on the initialized values for the corresponding pseudo-observation variables established in step S210. Then, in step S230, the system to be diagnosed is diagnosed in accordance with various exemplary embodiments of the invention. Finally, in step S240, the process ends.

Once the diagnostic subsystems have been initialized, observation values obtained from the physical system are used to update the values of the observation variables within each diagnostic subsystem. The values of these observations may vary from the values of the observation variables assigned to the observation variables in steps S210 and S220. A distributed diagnosis must then be performed.

Figure 7:
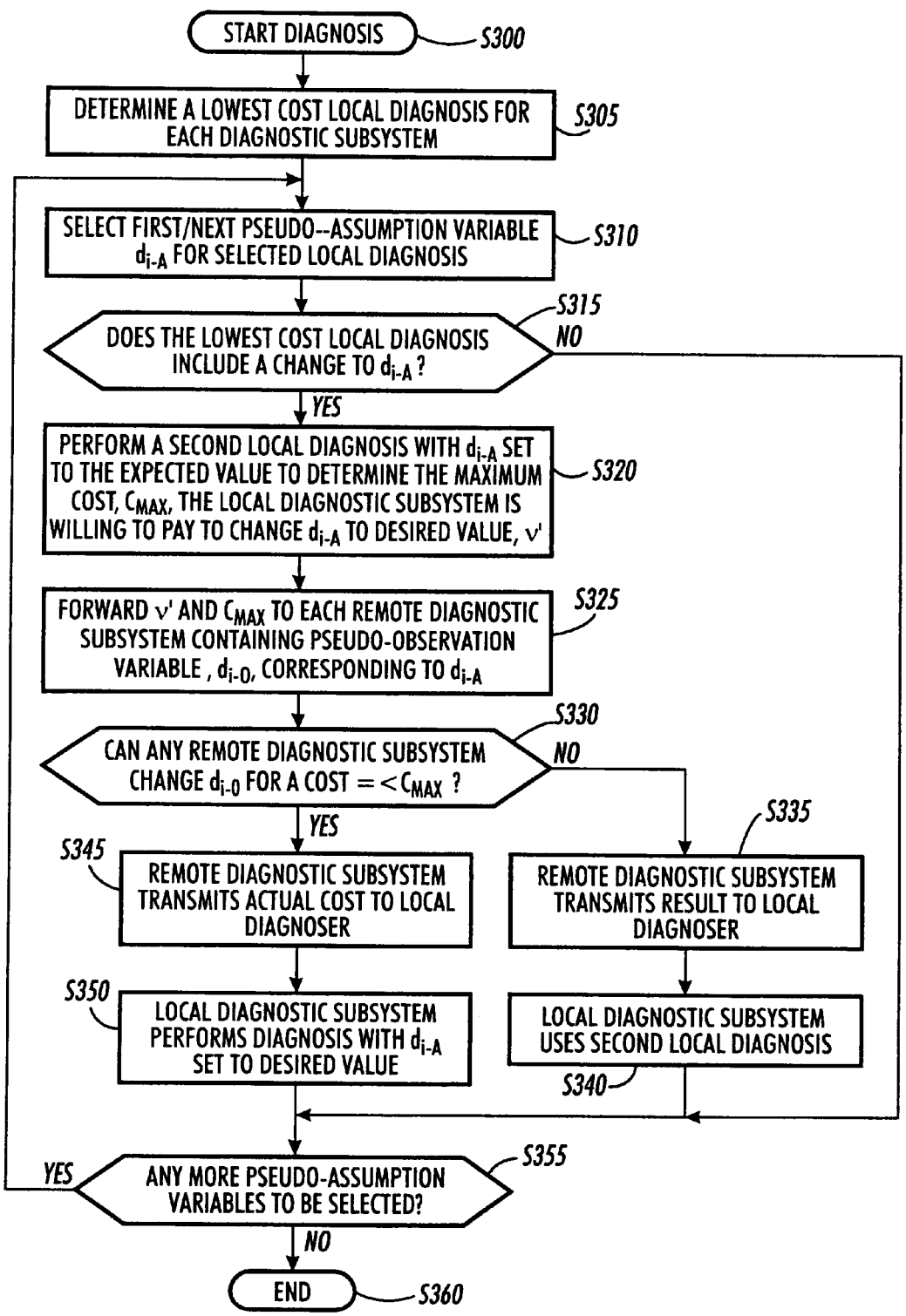
FIG. 7 is a flowchart outlining one exemplary embodiment of a method for determining a distributed model-based diagnosis according to the invention.

FIG. 7 is a flowchart outlining an exemplary embodiment of a method to determine a local diagnoses that is consistent with one or more other local diagnosis according to the invention. It should be appreciated that, before step S305 is performed, the local diagnostic subsystems have been initialized, for example, in accordance with steps S210 and S220 of FIG. 6. The diagnostic process begins when an observation variable in the current local diagnostic subsystem changes from its current value. This change indicates for example, a potential fault in the corresponding component. As shown in FIG. 7, the local diagnostic method begins in step S300 and continues to step S305, where a local diagnosis is performed to determine a lowest-cost assignment of values to the assumption variables, including all local pseudo-assumption variables $d_{i\text{-}A}$, that is consistent with the new values of the observation variables, including all local pseudo-observation variables $d_{i\text{-}O}$. In particular, in step S305, an expected value, $v_i$, for each pseudo-assumption value $d_{i\text{-}A}$ is determined from the corresponding pseudo-observation variable $d_{i\text{-}O}$. Operation then continues to step S310.

In step S310, a first or next pseudo-assumption variable of this local diagnostic subsystem, $d_{i\text{-}A}$, is selected. Next, in step S315, a determination is made whether the lowest-cost local diagnosis includes a change to the value of the currently selected pseudo-assumption variable, $d_{i\text{-}A}$. The lowest-cost local diagnosis is the most probable set of values for the assumption and pseudo-assumption variables of the local diagnostic subsystem given the current set of values for the observation and pseudo-observation variables that constrain the assumption and pseudo-assumption variables of this diagnostic subsystem. If not, operation jumps to step S355. Otherwise, operation continues to step S320, in which a second local diagnosis is performed with the value of the selected pseudo-assumption variable $d_{i-A}$ set to its initialized value. This value, $v_i$, corresponds to the current value of the associated pseudo-observation variable in a second local diagnostic subsystem. This second local diagnosis results in the determination of a maximum cost, $c_{max}$, that the local diagnostic subsystem is willing to "pay" to change the value of the selected pseudo-assumption variable $d_{i-A}$ to the expected value, $v_i$, for the current pseudo-assumption variable determined in step S305. Operation then continues to step S325.

In step S325, the local diagnostic subsystem forwards the expected value $v_i$ and the maximum cost $c_{max}$ to the second local diagnostic subsystem that contains the pseudo-observation variable, $d_{i-O}$, corresponding to the current pseudo-assumption variable $d_{i-A}$. Then, in step S330, a determination is made whether the second local diagnostic subsystem can change the value of the pseudo-observation variable $d_{i-O}$ for a cost that is less than or equal to the maximum cost $c_{max}$. That is, the second local diagnostic subsystem determines whether a diagnosis local to that second local diagnostic subsystem in which the value of the corresponding pseudo-observation variable $d_{i-O}$ is set to the expected value $v_i$ can be determined for a cost less than or equal to the maximum cost $c_{max}$. If not, operation continues to step S335. Otherwise operation jumps to step S345.

In step S335, the second local diagnostic subsystem transmits the actual costs, $c_f$, to the first diagnostic subsystem. Next, in step S340, the first diagnostic subsystem then uses the second local diagnosis determined in step S320. The second local diagnosis is used because the value of the selected pseudo-assumption variable $d_{i-A}$ cannot be set to the expected value $v_i$ for a cost less than or equal to $c_{max}$. Operation then jumps to step S355.

In contrast, in step S345, the second local diagnostic subsystem transmits the actual cost, $c_f$, to the first local diagnostic subsystem. Next, in step S350, the first local diagnostic subsystem uses the lowest cost local diagnosis, in which the value of the current pseudo-assumption variable $d_{i-A}$ is set to the expected value, $v_i$. Operation then continues to step S355.

In step S355, a determination is made whether any more pseudo-assumption variables $d_{i-A}$ remain to be processed for this local diagnostic subsystem. If so, operation jumps to step S310. Otherwise, the method ends at step S360.

In various exemplary embodiments, if the lowest cost local diagnosis includes a change to the value of the current pseudo-assumption variable $d_{i-A}$, an upper bound can be set on the cost the first local diagnostic subsystem is willing to pay to change the value of the corresponding pseudo-observation variable $d_{i-O}$. Thus, before requesting that a second local diagnostic subsystem perform a diagnosis to change the value of the corresponding pseudo-observation variable $d_{i-O}$ to match the value of the current pseudo-assumption variable $d_{i-A}$, the value of the current pseudo-assumption variable $d_{i-A}$ is fixed at its original value, and a second diagnosis is performed.

The second diagnosis gives a maximum cost, $C_{max}$, of making the local constraints consistent without changing the value of the current pseudo-assumption variable $d_{i-A}$. This is a maximum cost the first local diagnostic subsystem is willing to have attached to changing the value of the current pseudo-assumption variable $d_{i-A}$. Therefore, if the second local diagnostic subsystem cannot change the value of the corresponding pseudo-observation variable $d_{i-O}$ to the expected value, v', for a cost of $c_{max}$ or less, the first local diagnostic subsystem is better off using the second diagnosis that did not involve changing the value of the current pseudo-assumption variable $d_{i-A}$.

The first local diagnostic subsystem forwards the determined expected value, v', and the maximum cost, $c_{max}$, for the corresponding pseudo-observation variable $d_{i-O}$ to the second local diagnostic subsystem. If the second local diagnostic subsystem can produce a diagnosis that uses the expected value $v_i$ for the value of the corresponding pseudo-observation value $d_{i-O}$ for a cost $c_f$ that is less than the maximum cost $c_{max}$, the actual cost, $c_f$, is returned to the first local diagnostic subsystem. The diagnosis involving a diagnosis that uses the expected value $v_i$ for the value of the corresponding pseudo-observation value $d_{i-O}$ for a cost $c_f$ that is less than the maximum cost then becomes a local diagnosis of the first local diagnostic subsystem. If not, the first local diagnostic subsystem uses the determined second diagnosis at a cost of $c_{max}$ and the value of the current pseudo-assumption variable $d_{i-A}$ remains unchanged.

Thus, for each diagnosis that requires a value of the pseudo-assumption variable $d_{i-A}$ other than the expected value $v_i$, a cost, $c_i$, is assigned to that diagnosis. A local diagnostic subsystem will only find a diagnosis involving the pseudo-assumption variable $d_{i-A}$ if it cannot find a diagnosis involving changing the values of one or more local assumption variables for a cost less than $c_i$. Thus, a local diagnostic subsystem will only request a change to the corresponding pseudo-observation variable $d_{i-O}$ in a second diagnostic subsystem when the cost of resolving a conflicting observation locally is too high.

Figure 8:
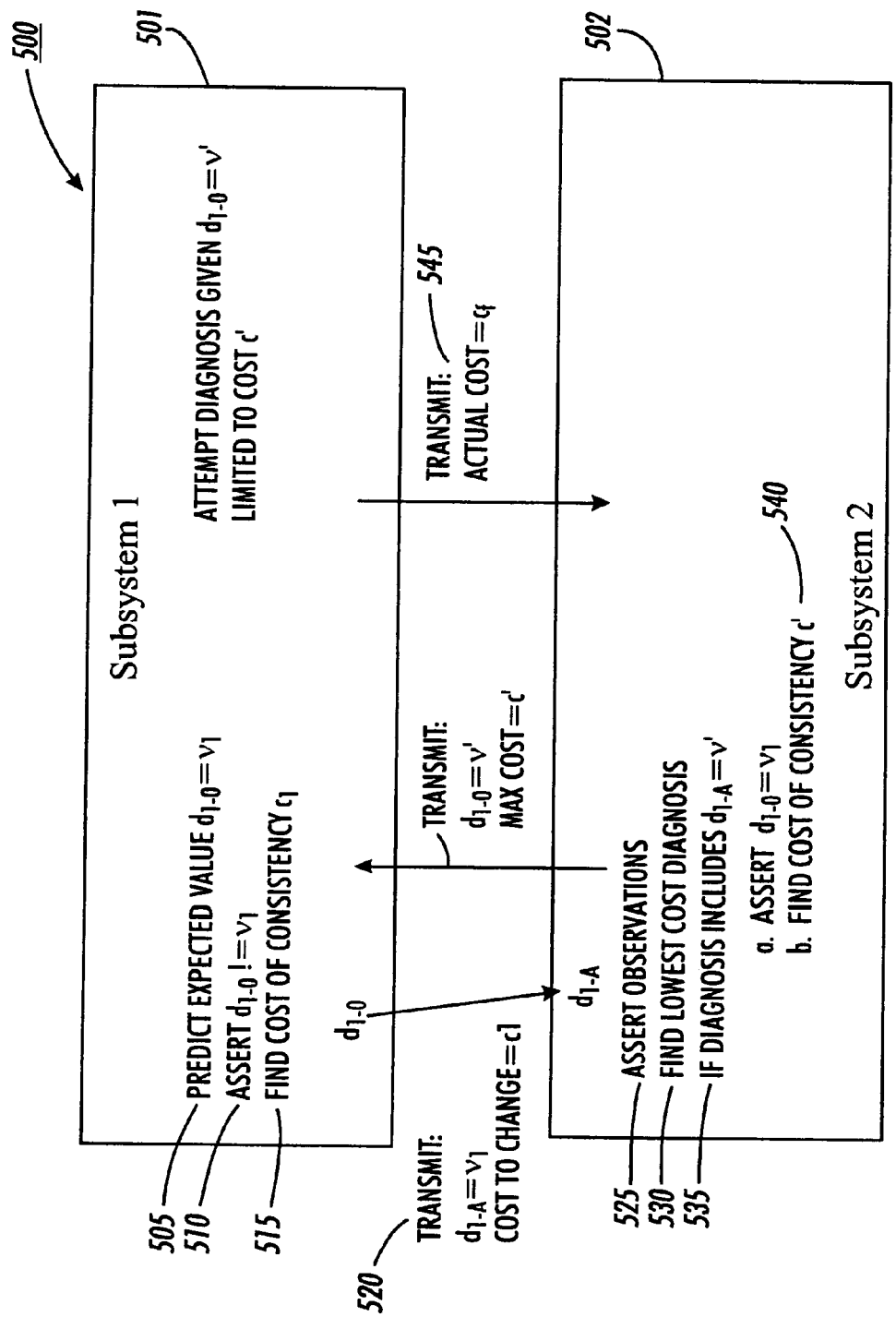
FIG. 8 is an illustration outlining one exemplary embodiment of a data flow diagram for a distributed optimization-based diagnosis according to the invention.

FIG. 8 is a data flow diagram illustrating a data flow for a first exemplary embodiment of a distributed diagnostic system 500 that implements optimization-based initialization and diagnosis according to the invention. In FIG. 8, the distributed diagnostic system 500 engages in a global diagnosis based on the local diagnoses of two local diagnostic subsystems 501 and 502. In various exemplary embodiments, any plural number of local diagnostic subsystems may be engaged in the global diagnosis. As shown in FIG. 8, a predicted value 505, $v_i$, for a given pseudo-observation variable 510, dog, is predicted. Then, that given pseudo-observation variable 510, $d_{1-O}$ is set to the predicted value 505. These are values representing one or more states of the component to be diagnosed. Next, the cost of consistency, that is, the cost to change the value of the given pseudo-observation variable 510 $d_{1-O}$ to its next most likely value, is determined.

The current value 505 for the given pseudo-observation variable 510 $d_{1-O}$, and the cost of consistency 515 $c_1$ are transmitted to the second diagnostic subsystem 502 that contains a pseudo-assumption variable 520, $d_{1-A}$, corresponding to the pseudo-observation variable 510, $d_{1-O}$.

The second local diagnostic subsystem 502 then performs an initialization process by assigning observation values 525 to observation variables corresponding to sensor readings from the component being diagnosed by the second local diagnostic subsystem 502. Next, the lowest cost diagnosis 530 for these observations is determined. Then, a determination is made as to whether the lowest cost diagnosis 530 includes a value 535 for the pseudo-assumption variable, 520 that is different from the expected value 505. If so, then the cost of consistency 540, $c_{max}$ or c', is determined for a second diagnosis in which the pseudo-assumption variable $d_{i-A}$ is set to $v_1$, the new value 535 for the pseudo assumption variable 520.

The second local diagnostic subsystem 502 transmits the new value 535, v', the desired value for the given pseudo-observation variable 510, and the maximum cost 515 or 540, $c_{max}$ or c', back to the first local diagnostic subsystem 501.

The first local diagnostic subsystem 502 attempts a local diagnosis in which the given pseudo-observation variable 510, $d_{1-O}$, is set equal to the new value 535, v' for a cost less than or equal to the cost of consistency 515 or 540, $c_{max}$ or c'. If a local diagnosis is found in which the pseudo-observation variable 510, $d_{1-O}$, is set equal to the new value 535, v' for a cost less than or equal to the cost of consistency 510 or 540, $c_{max}$ or c', then, the first local diagnostic subsystem 501 transmits the actual cost 540, $c_f$, to the second local diagnostic subsystem 502.

Once the first local diagnostic subsystem 501 has received all of its pseudo-observations, the data flow illustrated in FIG. 8 can be repeated between the first local diagnostic subsystem 501 and any other local diagnostic subsystem(s) that are supplying its assumptions.

The method illustrated in FIG. 7 and the data flow illustrated in FIG. 8 do not necessarily produce a globally optimal diagnosis. In FIG. 8, the second local diagnostic subsystem 502 will only request that the first local diagnostic subsystem 501 change the value 505 of the given pseudo-observation variable 510 $d_{1-O}$ if the second local diagnostic subsystem 502 cannot find a local diagnosis for a cost less than the cost of consistency 520, $c_1$. Thus, the second local diagnostic subsystem 502 may instead prefer a local diagnosis of cost c' where c' is less than the cost of consistency 520, $c_1$. In one or more embodiments of the invention, a third local diagnostic subsystem may exist that also has another pseudo-assumption, $d_{1-A}$, corresponding to the given the pseudo-observation variable 510 $d_{1-O}$. The third local diagnostic subsystem would also request a change to the value of the given pseudo-observation variable 510 $d_{1-O}$ if the third local diagnostic subsystem cannot find a local diagnosis of less than the cost of consistency 520, $c_1$. For example, the third local diagnostic subsystem may choose a local diagnosis of cost c" less than the cost of consistency 520, $c_1$. In this case, the second local diagnostic subsystem 502 and the third local diagnostic subsystem are both considering a request to change the given pseudo-observation variable 510, $d_{1-O}$, without knowledge of the other local diagnostic subsystem. A global diagnosis of cost c'+c", is determined because both the cost of consistency 520, c", the cost of consistency 520, and the cost of consistency 520, c', are less than $c_1$. However, there is no guarantee that c'+c" is less than $c_1$. That is, the second local diagnostic subsystem 502 changes its pseudo-assumption variable 520 for a cost c' while the third local diagnostic subsystem changes its pseudo-assumption variable $d_{1-A}$ for a cost c". However, the lowest total cost solution would have been for each of the second and third local diagnostic subsystems to change their pseudo-assumption variables to the predicted value 505 for a single cost of the cost of consistency 515, $c_1$. Accordingly, a globally minimal cost solution to the constraint problem cannot be determined while considering only local decisions.

Figure 9:
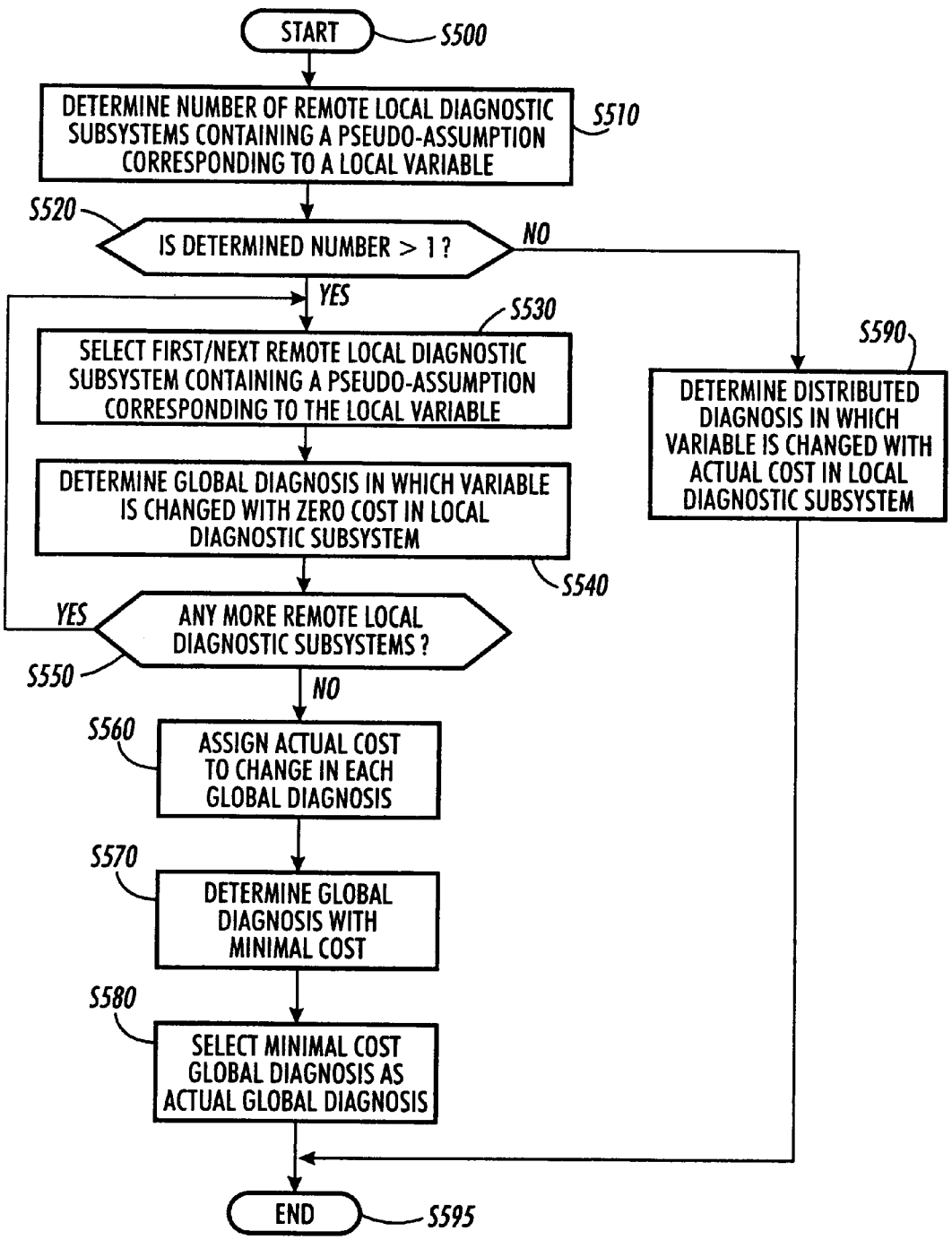
FIG. 9 is a flowchart outlining one exemplary embodiment of a method for determining a global diagnosis at least close to a globally minimal cost according to the invention.

FIG. 9 is a flowchart outlining an exemplary embodiment of a method for determining a global diagnosis at or close to a globally minimal cost according to the invention. As shown in FIG. 9, the method begins in step S500, and continues to step S510, where the number of diagnostic subsystems containing a pseudo-assumption variable, $d_{i-A}$, corresponding to a local variable, $d_{i-O}$, is determined. Next, in step S520, a determination is made whether the number of remote diagnostic subsystem containing the pseudo-assumption variable $d_{i-A}$ is greater than one. If so, operation continues to step S530. Otherwise, operation jumps to step S590.

In step S530, a first or next local diagnostic subsystem containing a pseudo-assumption variable $d_{i-A}$ corresponding to the local variable $d_i$ is selected. Next, in step S540, a global diagnosis is determined in which the pseudo-assumption variable $d_{i-A}$ is changed with zero cost in the local diagnostic subsystem. Next, in step S550, a determination is made whether any more local diagnostic subsystems exist containing a pseudo-assumption variable $d_{i-A}$ corresponding to the local variable $d_{i-O}$. If so, operation jumps to step S530. Otherwise, operation continues to step S560.

In step S560, the actual cost to change the pseudo-assumption variable $d_{i-A}$ in each local diagnostic subsystem is assigned. Next, in step S570, the global diagnosis with a minimum cost to change the pseudo-assumption variable $d_{i-A}$ is determined. Next, in step S580, the minimum cost global diagnosis determined in step S570 is selected as the actual global diagnosis. Operation then jumps to step S595.

In step S590, a distributed diagnosis is determined in which the pseudo-assumption variable $d_{i-A}$ is changed with its actual cost in the local diagnostic subsystem. In various exemplary embodiments, step S590 can be implemented by the exemplary method illustrated by the flowchart as shown in FIG. 7. Operation then continues to step S595, where the method ends.

Figure 10:
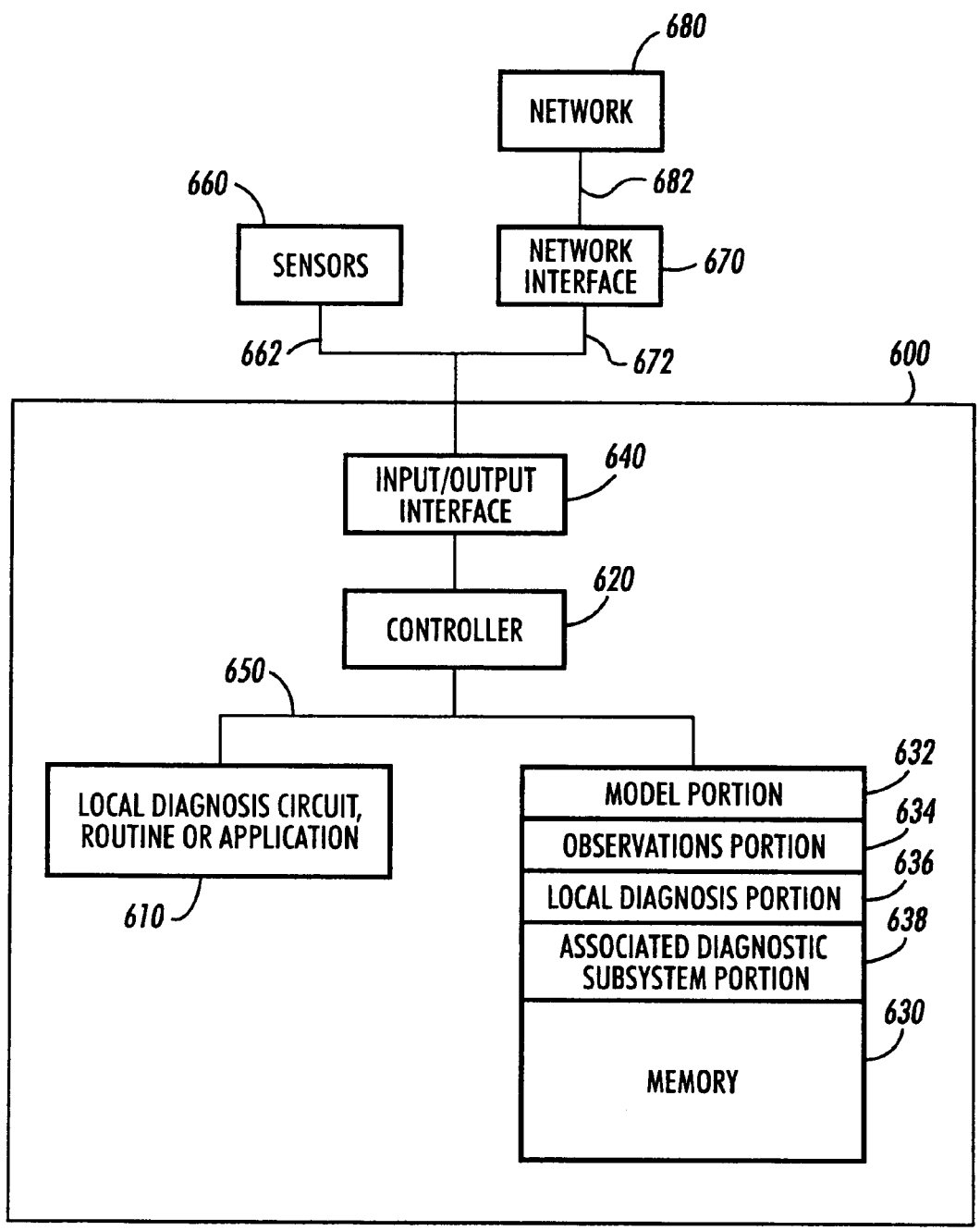
FIG. 10 is a block diagram showing one exemplary embodiment of a distributed optimization-based diagnostic system according to this invention.

FIG. 10 shows an exemplary embodiment of a local diagnostic subsystem 600 according to this invention. As shown in FIG. 10, the local diagnostic subsystem 600 includes a local diagnosis circuit, routine or application 610, a controller 620, a memory 630, and an input/output interface 640, each interconnected by one or more data/control busses and/or application programming interfaces 650. As shown in FIG. 10, one or more sensors 660 are connected over one or more links 662 to the input/output interface 640. Additionally, a network interface 670 is connected to the input/output interface 640 over a link 672. The network interface 670 enables the input/output interface 640 to communicate with an external network 680 over one or more links 682. Thus, the local diagnostic subsystem 600 may be in communication with, for example, other local diagnostic subsystems via the network 680. The local diagnostic subsystem 600 may instead or additionally be in communication with other local diagnostic subsystems in a peer-to-peer relationship via the input/output interface 640.

Each of the links 662, 672 and 682 can be implemented using any known or later developed device or system for connecting the corresponding one or more sensors 660, the network interface 670, and the external network 680, respectively, to the local diagnostic subsystem 600, including a direct cable connection, a connection over a wide area network, a connection over an intranet, a connection over the Internet, or a connection over any other distributed processing network or system. In general, each of the links 662, 672 and 682 can be any known or later developed connection system or structure usable to connect the corresponding one or more sensors 660, the network interface 670, and the external network 680, respectively, to the local diagnostic subsystem 600.

The input/output interface 640 inputs data from the network 680, and/or the one or more sensors 660 and outputs data to the network 680. The input/output interface 640 also outputs data to one or more of the controller 620, the memory 630 and/or the local diagnosis circuit, routine or application 610 and receives data from one or more of the controller 620, the memory 630 and/or the local diagnosis circuit, routine or application 610.

The memory 630 includes one or more of a model portion 632, an observation portion 634, a local diagnosis portion 636, and an associated diagnostic subsystem portion 638. In various exemplary embodiments, the model portion 632 stores the variables and constraints which together model the component being diagnosed. Thus, the model portion 632 may contain one or more observation variables, one or more assumption variables, one or more dependent variables, and one or more constraints. In various exemplary embodiments, the model portion 632 can also contain one or more pseudo-observation variables and/or one more or more pseudo-assumption variables.

In various exemplary embodiments, the observation portion 634 stores the sensor readings received from the one or more sensors 660 via the input/output interface 640. In various exemplary embodiments, the observation portion 634 also contains one more rules relating sensor readings to the observation values to be stored in the observation variables. In various exemplary embodiments, these rules are implemented as translation tables. In various exemplary embodiments, the rules are implemented as one or more logical statements stored in the observation portion 634 of the memory 630.

In various exemplary embodiments, the local diagnosis portion 636 stores the assumption values for the assumption variables and associated costs relating to the various local diagnoses. In various exemplary embodiments, the local diagnosis portion 636 also stores the assumption values corresponding to one or more pseudo-assumption variables and/or the observation values corresponding to one or more pseudo-observation variables, and the associated costs to change the values of these variables. In various exemplary embodiments, the local diagnosis portion 636 stores various logical routines associated with the local diagnosis process.

In various exemplary embodiments, the associated diagnostic subsystem portion 638 of the memory 630 holds information identifying other local diagnostic subsystems that contain pseudo-observation variables corresponding to the local pseudo-assumption variables of the local diagnostic subsystem 600 and pseudo-assumption variables corresponding to the local pseudo-observation variables of the local diagnostic subsystem 600. In various exemplary embodiments, the associated diagnostic subsystem portion 638 holds the various routines used by the local diagnosis circuit, routine or application 610 to manage the associated other local diagnostic subsystems. In various embodiments, the memory 630 stores one or more control routines used by the controller 620 to operate the local diagnostic subsystem 600.

The memory 630 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writeable or rewriteable optical disk and disk drive, a hard drive, flash memory or the like. Similarly, the non-alterable or fixed memory can be implemented using any one or more of ROM, PROM, EPROM, EEPROM, an optical ROM disk, such as CD-ROM or DVD-ROM disk, and disk drive or the like.

It should be understood that each of the circuit, routine or applications shown in FIG. 10 can be implemented as physically distinct hardware circuits within an ASIC, or using an FPGA, a PDL, a PLA or a PAL, a digital signal processor, or using discrete logic elements or discrete circuit elements. The particular form each of the circuits or routines shown in FIG. 10 will take is a design choice and will be obvious and predictable to those skilled in the art.

Figure 11:
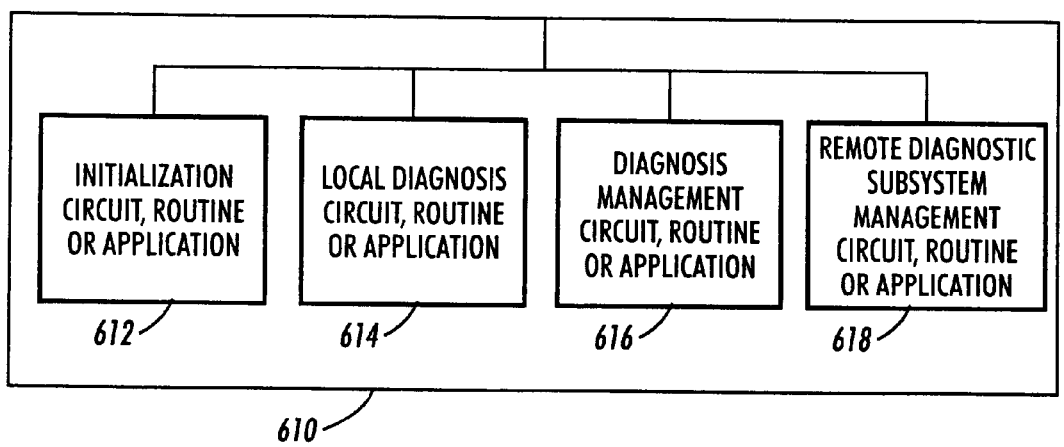
FIG. 11 is a block diagram showing in greater detail one exemplary embodiment of the local diagnosis circuit, routine or application of FIG. 10.

FIG. 11 is a block diagram showing in greater detail one exemplary embodiment of the local diagnosis circuit, routine or application 610 shown in FIG. 10.

As shown in FIG. 11, the local diagnosis circuit, routine or application 610 includes one or more of an initialization, circuit, routine or application 612, a local diagnosis circuit, routine or application 614, a diagnosis management circuit, routine or application 616, and/or a remote diagnostic subsystem management circuit, routine or application 618.

In various exemplary embodiments, the initialization circuit, routine or application 612 initializes a local diagnostic subsystem 600 to values indicative of the normal functioning of the diagnosed physical system. In various exemplary embodiments, the initialization circuit, routine or application 612 interacts with the diagnosis management circuit, routine or application 616 and/or the remote diagnostic subsystem management circuit, routine or application 618 to participate in initializing one or more other local diagnostic subsystems.

In various exemplary embodiments, the local diagnosis circuit, routine or application 614 determines a local diagnosis for the local diagnostic subsystem 600 to be used in a distributed diagnosis. In various exemplary embodiments, the diagnosis management circuit, routine or application 616 controls the local diagnosis circuit, routine or application 614 and interacts with the remote diagnostic subsystem management circuit, routine or application 618 to manage the local diagnostic information used in the distributed diagnosis.

In various exemplary embodiments, the remote diagnoser management circuit, routine or application 618 implements the communication routines used in the distributed diagnosis framework. In various exemplary embodiments, the remote diagnostic subsystem management circuit, routine or application 618 maintains one or more databases indicating associated local diagnostic subsystems and pseudo-assumption variables and/or pseudo-observation variables and values. In various exemplary embodiments, the remote diagnostic subsystem management circuit, routine or application 618 implements logical routines useful in the coordination of associated local diagnostic subsystems.

While this invention has been described in conjunction with the exemplary embodiments outlined above,it is evidenced that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A local diagnostic subsystem usable to diagnose a component of a physical system, comprising:

at least one observation variable, each observation variable storing a physical value received from a sensor monitoring a first component that describes a state of the first component;

at least one assumption variable, each assumption variable storing a value representing an assumption about the state of the first component;

at least one dependent variable, each dependent variable storing a value representing a quantity relating one of the at least one observation variable to one of the at least one assumption variable;

a plurality of constraints, each constraint relating two of the at least one observation variable, the at least one assumption variable and the at least one dependent variable to describe a behavior of the component; and at least one diagnosis variable relating a local diagnosis of the local diagnostic subsystem to a second local diagnosis of a second local diagnostic subsystem.

2. The local diagnostic subsystem of claim 1, wherein the one or more variables comprise at least one of at least one local pseudo-assumption variable that corresponds to a pseudo-assumption variable of the second local diagnostic subsystem, and at least one local pseudo-observation variable that corresponds to a pseudo-assumption variable of the second local diagnostic subsystem.

3. A diagnostic system usable to diagnose a component of a physical system, comprising:

an initialization circuit, routine or application that initializes the diagnosis system to an initial diagnosis;

a local diagnosis circuit, routine or application that generates one or more candidate local diagnoses based on a physical value received from a sensor monitoring the component, the physical value describing a state of the component;

a diagnosis management circuit, routine or application that selects a local diagnosis from among the one or more candidate local diagnoses; and a remote diagnosis management circuit, routine or application that communicates with a second diagnostic system, wherein zero, one or more of the candidate local diagnoses are based in part on a second local diagnosis generated by the second diagnostic system.

4. A method for diagnosing a physical system, the system comprising a plurality of physical components being diagnosed by a plurality of local diagnostic subsystems, the method comprising:

initializing a first local diagnostic subsystem to an initial diagnosis;

assigning an observation value to an observation variable of the first local diagnostic subsystem, wherein the observation value corresponds to a physical value received from a sensor monitoring a first component and describing a state of the first component;

performing a first local diagnosis in the first local diagnostic subsystem to determine a minimal cost diagnosis explaining the observation value;

determining whether the lowest cost diagnosis requires a change in the value of a pseudo-assumption variable of the first local diagnostic subsystem to a desired value;

performing a second local diagnosis in the first local diagnostic subsystem in which the value of the pseudo-assumption variable is held constant to determine a maximum cost;

supplying a desired value and the determined maximum cost to a second local diagnostic subsystem where the second local diagnostic subsystem contains a pseudo-observation variable corresponding to the pseudo-assumption variable of the first local diagnostic subsystem;

performing a third local diagnosis in the second local diagnostic subsystem to determine whether a diagnosis in which the pseudo-observation variable is set to the desired value can be performed for a cost less than the maximum cost;

adopting the first local diagnosis in the first local diagnostic subsystem when the third local diagnosis can not be performed for a cost less than the maximum cost; and adopting the second local diagnosis in the first local diagnostic subsystem when the third local diagnosis can be performed for a cost less than the maximum cost.

* * * * *

UNITED STATES PATENT AND TRADEMARK OFFICE
CERTIFICATE OF CORRECTION

| | |
|---|---|
| PATENT NO. | : 6,687,653 B1 |
| APPLICATION NO. | : 10/217026 |
| DATED | : February 3, 2004 |
| INVENTOR(S) | : James A Kurien et al. |

It is certified that error appears in the above-identified patent and that said Letters Patent is hereby corrected as shown below:

Column 1, line 4, insert as a new paragraph:

This invention was made with Government support under F33615-99-C-3611 awarded by DARPA. The Government has certain rights in this invention.

Signed and Sealed this

Eighteenth Day of March, 2008

JON W. DUDAS
*Director of the United States Patent and Trademark Office*